United States Patent
Xue et al.

(10) Patent No.: US 12,133,089 B2
(45) Date of Patent: Oct. 29, 2024

(54) MAINTENANCE OF MULTI-BEAM UNICAST LINK FOR SIDELINK COMMUNICATIONS

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/670,161

(22) Filed: Feb. 11, 2022

(65) Prior Publication Data

US 2023/0262479 A1 Aug. 17, 2023

(51) Int. Cl.
| | |
|---|---|
| *H04W 16/28* | (2009.01) |
| *H04W 72/044* | (2023.01) |
| *H04W 72/20* | (2023.01) |
| *H04W 76/19* | (2018.01) |
| *H04W 76/28* | (2018.01) |

(52) U.S. Cl.
CPC ......... *H04W 16/28* (2013.01); *H04W 72/046* (2013.01); *H04W 72/20* (2023.01); *H04W 76/19* (2018.02); *H04W 76/28* (2018.02)

(58) Field of Classification Search
CPC ..... H04W 16/28; H04W 76/19; H04W 76/28; H04W 72/20; H04W 72/046
See application file for complete search history.

(56) References Cited

U.S. PATENT DOCUMENTS

| | | | |
|---|---|---|---|
| 2021/0051500 A1* | 2/2021 | Chae | H04L 5/0048 |
| 2021/0306059 A1* | 9/2021 | Sakhnini | H04L 5/0053 |
| 2021/0315045 A1 | 10/2021 | Dutta et al. | |
| 2022/0159742 A1* | 5/2022 | Xu | H04W 24/10 |
| 2022/0272568 A1* | 8/2022 | Lee | H04W 52/0229 |
| 2022/0368479 A1* | 11/2022 | Jiang | H04L 5/005 |
| 2022/0416417 A1* | 12/2022 | Zhang | H01Q 21/29 |
| 2022/0416848 A1* | 12/2022 | Zhang | H01Q 3/36 |

FOREIGN PATENT DOCUMENTS

| | | | | |
|---|---|---|---|---|
| EP | 4156812 A1 | 3/2023 | | |
| WO | WO-2021040379 A1 * | 3/2021 | ........... | H04L 1/1812 |
| WO | WO-2021096977 A1 * | 5/2021 | ........... | H04B 7/0617 |
| WO | WO-2021237702 A1 * | 12/2021 | ........... | H04L 1/1671 |

OTHER PUBLICATIONS

International Search Report and Written Opinion—PCT/US2023/060825—ISA/EPO—Apr. 28, 2023.

* cited by examiner

*Primary Examiner* — Mewale A Ambaye
(74) *Attorney, Agent, or Firm* — Polsinelli LLP

(57) ABSTRACT

Disclosed are systems and techniques for wireless communications. In one example, an apparatus for wireless communication at a first user equipment (UE) can send a first sidelink communication to a second UE using a first beam pair of a unicast link with the second UE, wherein the first beam pair includes a first transmission beam and a first reception beam. In some aspects, the apparatus can determine a fault associated with at least one of the first transmission beam and the first reception beam.

30 Claims, 9 Drawing Sheets

MAINTENANCE OF MULTI-BEAM UNICAST LINK FOR SIDELINK COMMUNICATIONS

FIELD OF THE DISCLOSURE

The present disclosure generally relates to wireless communications. For example, aspects of the present disclosure relate to systems and techniques for implementing a multi-beam unicast link for sidelink communications.

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Aspects of LTE, 5G, and/or other communications protocols may support direct communications between devices, which may be referred to as sidelink communications. As used herein, sidelink or sidelink communications generally refers to any direct device-to-device communication protocol. For example, the term sidelink may refer to 3GPP sidelink (e.g., using a PC5 sidelink interface). Sidelink may also refer to a Wi-Fi protocol for direct device-to-device communications, referred to as Dedicated Short Range Communication (DSRC) protocol. As the demand for mobile broadband access and general communications continues to increase, further improvements in 5G, LTE, and other radio access technologies, as well as other communications technologies (e.g., WiFi, etc.), remain useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In some cases, sidelink communications can be established using one or more unicast links that can include a beam pair (e.g., a transmitting component beam and a receiving component beam). In some aspects, sidelink communications utilizing one or more unicast links may experience a discontinuous transmission (DTX) due to a failure associated with one or more of the component beams. For example, a user equipment (UE) may determine that DTX has occurred based on reception of a negative acknowledgement (NACK) and/or if the UE does not receive a response to a request for feedback. In some examples, detection of one or more DTXs may result in radio link failure (RLF). In some instances, a UE may determine a fault associated with a component beam and initiate beam refinement and/or beam recovery prior to RLF.

In some aspects, a first UE may send (e.g., transmit) a first sidelink communication to a second UE using a first beam pair of a unicast link between the first UE and the second UE. In some cases, the first beam pair may include a first transmission beam and a first reception beam. In some examples, the first UE may determine a fault associated with at least one of the first transmission beam and the first reception beam.

In some cases, the first UE may send a second sidelink communication to the second UE and determine the fault based on whether a response to the second sidelink communication is received. In some cases, the response to the second sidelink communication may include hybrid automatic repeat request (HARQ) corresponding to the first sidelink communication. In some examples, the second sidelink communication may be implemented using a second beam pair that includes at least one of the first transmission beam and the second transmission beam. In some cases, the response to the second sidelink transmission may include HARQ corresponding to the second sidelink transmission. In some aspects, HAQR corresponding to the second sidelink transmission can be used to determine fault whether fault is associated with the first transmission beam or whether the fault is associated with the first reception beam.

Disclosed are systems, methods, apparatuses, and computer-readable media for performing wireless communications. In one illustrative example, a method for wireless communications performed by a first user equipment (UE) is provided. The method includes: sending a first sidelink communication to a second UE using a first beam pair of a unicast link with the second UE, wherein the first beam pair includes a first transmission beam and a first reception beam; and determining a fault associated with at least one of the first transmission beam and the first reception beam.

In another example, an apparatus for wireless communication at a first user equipment (UE) is provided that includes at least one memory comprising instructions and at least one processor (e.g., implemented in circuitry) coupled to the at least one memory. The at least one processor is configured to execute the instructions and cause the apparatus to: send a first sidelink communication to a second UE using a first beam pair of a unicast link with the second UE, wherein the first beam pair includes a first transmission beam and a first reception beam; and determine a fault associated with at least one of the first transmission beam and the first reception beam.

In another example, a non-transitory computer-readable medium is provided for performing wireless communications, which has stored thereon instructions that, when executed by one or more processors, cause the one or more processors to: send a first sidelink communication to a user equipment (UE) using a first beam pair of a unicast link with the UE, wherein the first beam pair includes a first transmission beam and a first reception beam; and determine a fault associated with at least one of the first transmission beam and the first reception beam.

In another example, an apparatus for wireless communications is provided. The apparatus includes: means for sending a first sidelink communication to a second UE using a first beam pair of a unicast link with the second UE, wherein the first beam pair includes a first transmission beam and a first reception beam; and means for determining a fault associated with at least one of the first transmission beam and the first reception beam.

In some aspects, the apparatus is or is part of a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device having a radio frequency (RF) interface. In some aspects, the apparatus is or is part of a base station (e.g., a 3GPP gNodeB (gNB) for 5G/NR, a 3GPP eNodeB (eNB) for LTE, a Wi-Fi access point (AP), or other base station). In some aspects, the apparatus includes a transceiver configured to transmit and/or receive radio frequency (RF) signals. In some aspects, the processor includes a neural processing unit (NPU), a central processing unit (CPU), a graphics processing unit (GPU), or other processing device or component.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
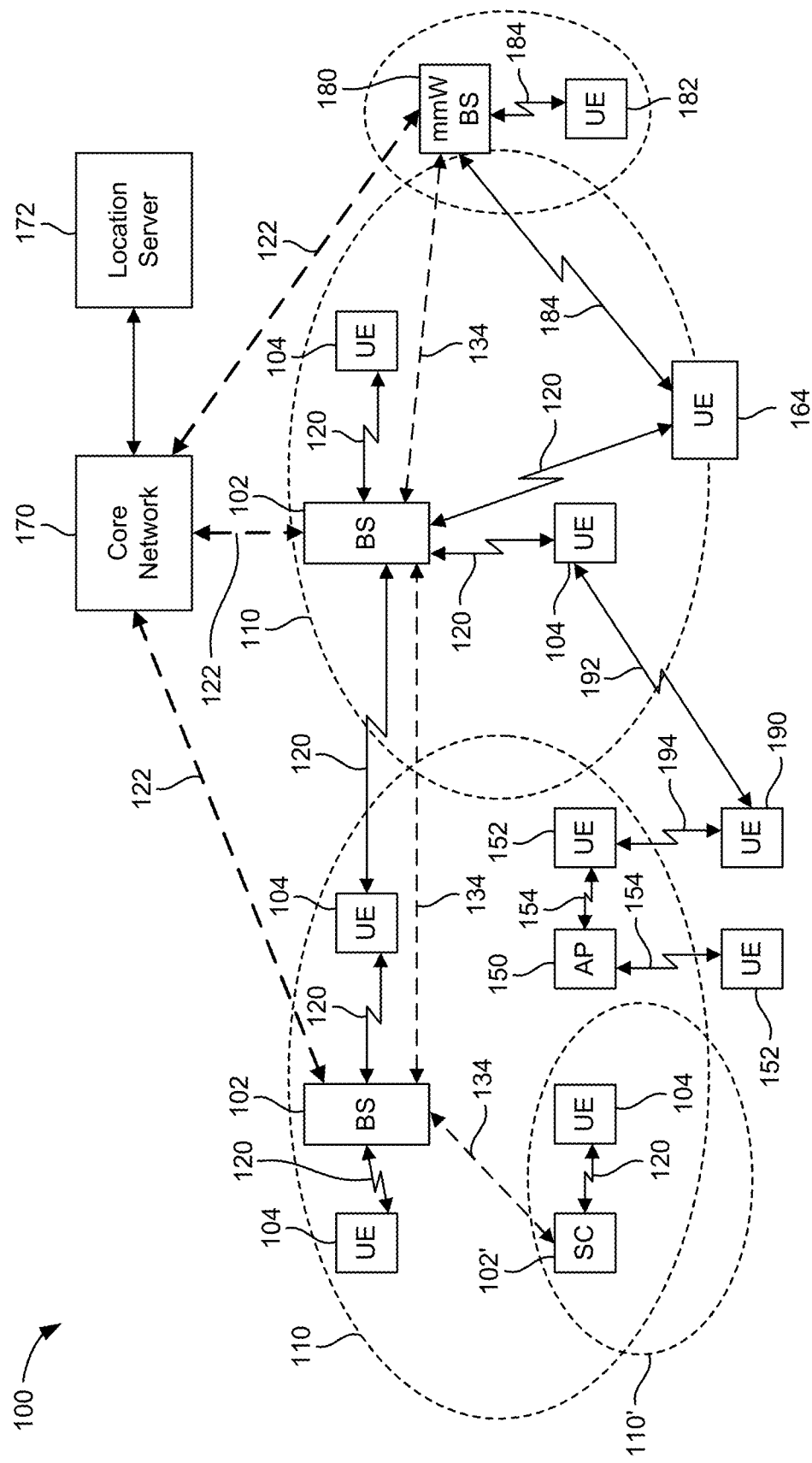
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station). In one example, an access link between a UE and a 3GPP gNB can be over a Uu interface. In some cases, an access link may support uplink signaling, downlink signaling, connection procedures, etc.

A sidelink may refer to any communication link between client devices (e.g., UEs, STAs, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 gigahertz (GHz) or 6 GHz). As used herein, the term sidelink can refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some examples, sidelink communications can be established using a unicast link. In some cases, a user equipment (UE) can use a unicast link to perform link adaptation to improve efficiency and reliability of the sidelink interface. In some aspects, PC5 radio resource control (PC5-RRC) can be used to configure a sidelink channel state information reference signal (SL-CSI-RS) and/or a timer that can be used to obtain sidelink channel state information (SL-CSI) from a UE. For example, a transmitting UE can include a layer 1 (physical layer) trigger than can be used to request SL-CSI from a receiving UE. In some cases, the request can be based upon co-subchannel SL-CSI-RS. In some aspects, the receiving UE can respond to the trigger by sending a medium access control (MAC) control element (CE) to the transmitting UE that can contain a SL-CSI report.

In some aspects, a transmitting UE may use a unicast link to request hybrid automatic repeat request (HARQ) feedback from a receiving UE. In some cases, the HARQ feedback can include an acknowledgment (ACK) and/or a negative acknowledgement (NACK). In some cases, sidelink control information (SCI) can include a layer 2 (e.g., MAC layer) identifier that can be used to identify the intended receiving UE. In some examples, the receiving UE may decode SCI and respond with ACK or NACK (e.g., using an indicated Physical Sidelink Feedback Channel (PSFCH) resource). In some cases, failed reception of a sidelink unicast transmission can result in a discontinuous transmission (DTX). In some examples, the transmitting UE can detect and monitor consecutive DTXs to detect radio link failure (RLF).

In some configurations, discontinuous reception (DRX) and/or partial sensing can be implemented by battery-powered UEs. In some cases, inter-UE coordination may also be configured to improve the reliability of resource allocation in sidelink mode 2 (e.g., where a UE can autonomously select resources for sidelink transmissions). In some cases, such configurations can be limited to sidelink communications certain frequency bands (e.g., sub-6 GHz bands). In some instances, implementations in such frequency bands can be resource constrained. In some cases, additional resources for sidelink communications may be available using unlicensed frequency bands (e.g., 6 GHz, 60 GHz, etc.). However, implementing beamforming-based deployments for sidelink communications in certain frequency bands (e.g., a 60 GHz band or other band) can present challenges with regard to link reliability.

Systems, apparatuses, processes (also referred to as methods), and computer-readable media (collectively referred to as "systems and techniques") are described herein for implementing a multi-beam unicast link for sidelink communications. The systems and techniques provide the ability for a user equipment (UE) to monitor the status of one or more component beams and/or one or more beam pairs used for a multi-beam unicast link. The systems and techniques also provide the ability for a UE to select beam pairs based on reliability metrics and to perform link maintenance to improve performance of the multi-beam unicast link.

In some cases, a transmitting UE can monitor a sidelink interface to determine radio link failure (RLF). For example, a transmitting UE can detect DTX if a receiving UE fails to decode SCI or if the transmitting UE does not receive PSFCH. In some cases, the transmitting UE can maintain a count of a number of DTXs (e.g., counter can be used to monitor the number of consecutive DTXs and be incremented for each consecutive DTX). In some cases, a transmitting UE can detect RLF if the DTX count is greater than or equal to a threshold value. In some examples, RLF can cause a transmitting UE to trigger unicast re-establishment.

In some aspects, a first UE and a second UE can establish a unicast link using multiple beam pairs. In some cases, a multi-beam interface can be used to improve the sidelink connection (e.g., mitigating blockage in higher frequency bands). In some examples, a multi-beam interface can provide flexibility for scheduling transmission resources for a UE that is maintaining multiple simultaneous unicast connections with other UEs.

In some examples, a transmitting UE can use feedback information (e.g., HARQ feedback) to select and/or perform beam maintenance of beam pairs associated with a multi-beam unicast link for sidelink communications. For example, a transmitting UE can maintain one or more counts associated with one or more beam pairs and/or one or more component beams. In some aspects, the counts can be used to determine the reliability of a component beam and/or a beam pair. In some cases, a transmitting UE may increment the count for a beam pair and/or a component beam based on a discontinuous transmission (DTX). In some cases, a counter can be used to monitor the number of DTXs. For example, a transmitting UE may increment a counter for a component beam and/or a beam pair if it does not receive any response to a request for feedback for an associated sidelink transmission (e.g., receiving UE fails to decode SCI). In another example, a transmitting UE may increment a counter for a component beam and/or a beam pair if it receives a NACK in response to a sidelink transmission.

In some cases, a transmitting UE may initiate beam refinement based on a number of DTXs associated with a component beam and/or a beam pair. In some aspects, a transmitting UE may initiate beam recovery based on a number of DTXs associated with a component beam and/or a beam pair. In some examples, a transmitting UE may detect radio link failure (RLF) based on a number of DTXs associated with a component beam and/or a beam pair.

Various aspects of the systems and techniques will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof. Generally, UEs can communicate with a core network (e.g., core network 170) via a radio access network (RAN), and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on In some aspects, the wireless communications system 100 may include one or more network entities (e.g., network device or network node). A network entity (or network device or network node) can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a base station such as base stations 102 (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc.

In some aspects, deployment of communication systems (e.g., wireless communications system 100) such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (e.g., base stations 102), or one or more units (or one or more components) performing base station functionality, may be implemented in an aggregated or disaggregated architecture. For example, base stations 102 (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

In some cases, an aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

In some examples, base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some aspects, the base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2P link 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

As noted above, UE 104 and UE 190 can be configured to communicate using sidelink communications. In some examples, UE 104 and UE 190 can operate using one or more different modes for sidelink communications. For example, in mode 1 the cellular network (e.g., base station 102) can select and manage the radio resources used by the UEs for performing sidelink communications. In another example, the UE 104 and UE 190 can be configured to operate using mode 2 in which the UEs can autonomously select the radio resources for sidelink communications. Mode 2 can operate without cellular coverage, and in some cases can be considered a baseline sidelink communications mode as devices and/or applications may not depend on the availability of cellular coverage. In some examples, mode 2 can include a distributed scheduling scheme for UEs to select radio resources.

In some aspects, UE 104 and UE 190 can be configured to implement a multi-beam unicast link for sidelink communications. In some examples, UE 104 and UE 190 can use PC5 radio resource control (RRC) protocol to establish and maintain a multi-beam unicast link that can be used for sidelink communications. In some cases, a sidelink transmission can include a request for feedback (e.g., a hybrid automatic repeat request (HARQ)) from the receiving UE. In some instances, the feedback request can be included in the sidelink control information (SCI) (e.g., SCI 1 in Physical Sidelink Control Channel (PSCCH) and/or SCI 2 in Physical Sidelink Shared Channel (PSSCH)). In some aspects, the feedback can correspond to an acknowledgement (ACK) or a negative acknowledgement (NACK).

In some examples, a transmitting UE (e.g., UE 104 and/or UE 190) can use feedback information to select and/or perform beam maintenance of beam pairs associated with a unicast link for sidelink communications. For example, a transmitting UE can maintain one or more counts associated with one or more beam pairs and/or one or more component beams. In some aspects, the counts can be used to determine the reliability of a component beam and/or a beam pair. In some cases, a transmitting UE may increment the count for a beam pair and/or a component beam based on a discontinuous transmission (DTX). For example, a transmitting UE may increment the count for a component beam and/or a beam pair if it does not receive any response to a request for feedback for an associated sidelink transmission (e.g., receiving UE fails to decode SCI). In another example, a transmitting UE may increment the count for a component beam and/or a beam pair if it receives a NACK in response to a sidelink transmission. In some aspects, one or more of the counts can be maintained using one or more counters that may be implemented in hardware and/or software.

In some cases, a transmitting UE may initiate beam refinement based on a number of DTXs associated with a component beam and/or a beam pair. In some aspects, a transmitting UE may initiate beam recovery based on a number of DTXs associated with a component beam and/or a beam pair. In some examples, a transmitting UE may detect radio link failure (RLF) based on a number of DTXs associated with a component beam and/or a beam pair.

Figure 2:
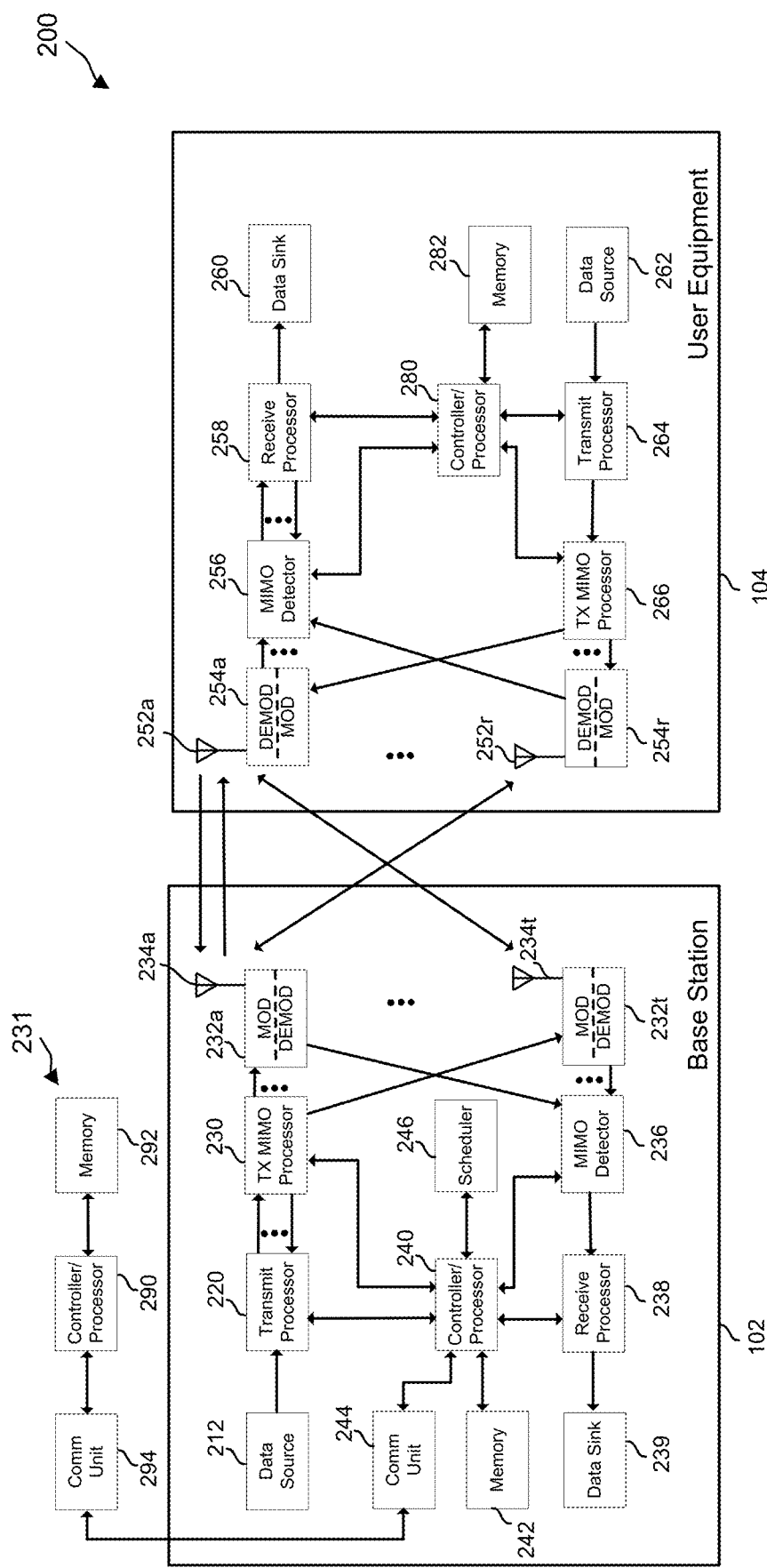
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some implementations, the UE 104 can include: means for sending a first sidelink communication to a user equipment (UE) using a first beam pair of a unicast link with the second UE, wherein the first beam pair includes a first transmission beam and a first reception beam; and means for determining a fault associated with at least one of the first transmission beam and the first reception beam. In some examples, the means for sending can include controller/processor 280, transmit processor 264, TX MIMO processor 266, DEMODs 254a through 254r, antennas 252a through 252r, any combination thereof, or any other component(s) of the UE 104. In some examples, the means for determining can include controller/processor 280, memory 282, receive processor 258, transmit processor 264, any combination thereof, or any other component(s) of the UE 104.

Figure 3:
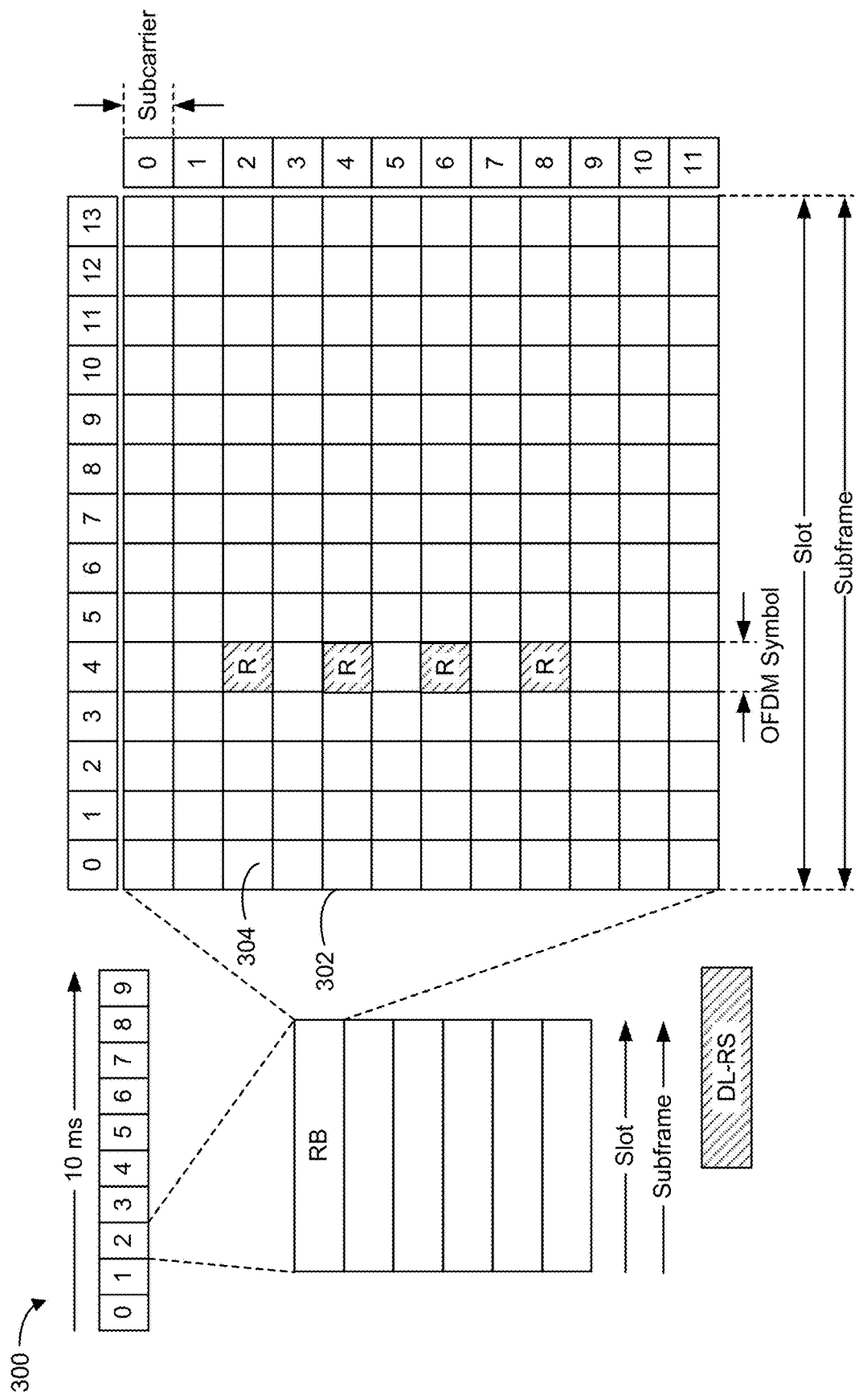
FIG. 3 is a diagram illustrating an example of a frame structure, in accordance with some examples.

Various radio frame structures may be used to support downlink, uplink, and sidelink transmissions between network nodes (e.g., base stations and UEs). FIG. 3 is a diagram 300 illustrating an example of a frame structure, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (p). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| | SCS (kHz) | Symbols/ Sot | Slots/ Sub-frame | Slots/ Frame | Slot Duration (ms) | Symbol Duration (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302. The resource grid is further divided into multiple resource elements (REs). Referring to FIG. 3, the RB 302 includes multiple REs, including the resource element (RE) 304. The RE 304 may correspond to one symbol length in the time domain and one subcarrier in the frequency domain. In the numerology of FIG. 3, for a normal cyclic prefix, RB 302 may contain 12 consecutive subcarriers in the frequency domain and seven consecutive symbols in the time domain, for a total of 84 REs such as RE 304. For an extended cyclic prefix, an RB may contain 12 consecutive subcarriers in the frequency domain and six consecutive symbols in the time domain, for a total of 72 REs. The number of bits carried by each RE depends on the modulation scheme.

In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs used to transmit DL-RS (labeled "R").

In some aspects, one or more resources in the resource grid can be used to perform sidelink communications. For example, sidelink communications can be implemented using a mode (e.g., mode 1) in which a base station (e.g., base station 102) can designate/select one or more resources (e.g., resource elements (e.g., RE 304), resource blocks (e.g., RB 302), subcarriers, symbols, frames, sub-frames, etc.) for sidelink communications. In another example, sidelink communications can be implemented using a mode (e.g., mode 2) in which a UE (e.g., UE 104) can designate/select one or more resources (e.g., resource elements (e.g., RE 304), resource blocks (e.g., RB 302), subcarriers, symbols, frames, sub-frames, etc.) for sidelink communications. In some aspects, resource allocation for sidelink communications can correspond to one or more subchannels in the frequency domain and one or more slots in the time domain. In some cases, a subchannel may include from 10 RBs to 100 RBs. In some examples, a sidelink slot may include 7-14 OFDM symbols.

In some examples, a UE (e.g., UE 104) can be configured to receive a sidelink packet by performing blind decoding of all sidelink subchannels. In some aspects, the sidelink UE can decode a Physical Sidelink Control Channel (PSCCH) in a configured sidelink resource pool. In some cases, the PSCCH can be used to carry sidelink control information (SCI) which contains information about the resource allocation on the Physical Sidelink Shared Channel (PSSCH). For example, a first stage SCI can be transmitted in PSCCH and may include information regarding the PSSCH bandwidth as well as resource reservations in future slots. In some cases, a second stage SCI can be located and decoded after decoding PSCCH. In some aspects, a source identifier and/or a destination identifier can be used to determine a source and/or destination UE associated with a packet. In some examples, the UE can proceed with decoding PSSCH if PSCCH (e.g., SCI) indicates a receiver ID matching the UE's ID. In some configurations, PSCCH and PSSCH can be transmitted using the same slot.

In some examples, PSCCH may be configured to occupy or use multiple RBs in a single subchannel. In some aspects, a subchannel can occupy multiple PRBs (e.g., a subchannel can occupy 10, 15, 20, 25, 50, 75, 100 PRBs). In some cases, PSCCH may be configured to occupy 10, 12, 15, 20, or 25 PRBs in a subchannel. In some aspects, PSCCH may be limited to one subchannel. In some cases, the duration of PSCCH can be configured use 2 or 3 symbols. In some aspects, a resource pool (RP) can include any number of subchannels (e.g., a RP can include 1-27 subchannels). In some cases, the size of PSCCH may be fixed for a RP (e.g., size can correspond to 10% to 100% of a subchannel). In some examples, PSSCH may occupy 1 or more subchannels and may include a second stage SCI.

Figure 4:
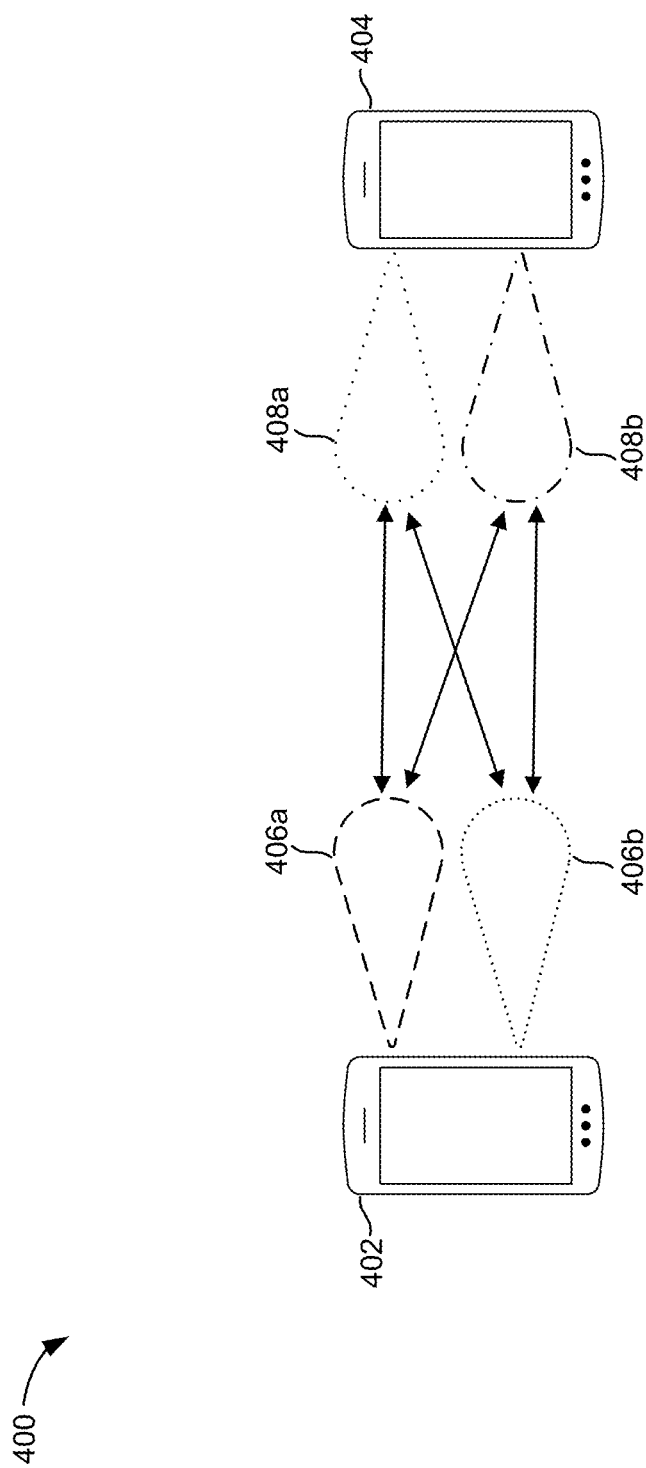
FIG. 4 is a block diagram illustrating an example of a wireless communications system that supports a multi-beam unicast link for sidelink communications, in accordance with some examples.

As noted above, systems and techniques are described herein for implementing a multi-beam unicast link for sidelink communications. FIG. 4 is a diagram illustrating an example of a wireless communications system 400 that supports a multi-beam unicast link for sidelink communications. In some examples, system 400 can include one or more user equipment (UE) devices, such as UE 402 and UE 404. As noted with respect to FIG. 1, a UE may include and/or be referred to as an access terminal, a user device, a user terminal, a client device, a wireless device, a subscriber device, a subscriber terminal, a subscriber station, a mobile device, a mobile terminal, a mobile station, or variations thereof. In some aspects, a UE can include a mobile telephone or so-called "smart phone", a tablet computer, a wearable device, an extended reality device (e.g., a virtual reality (VR) device, an augmented reality (AR) device, or a mixed reality (MR) device), a personal computer, a laptop computer, an internet of things (IoT) device, a television, a vehicle (or a computing device of a vehicle), or any other device having a radio frequency (RF) interface.

In some aspects, UE 402 and UE 404 may utilize sidelink communications to communicate directly with each other. In some examples, UE 402 and UE 404 may implement a multi-beam unicast link for sidelink communications. In some cases, UE 402 may implement a multi-beam unicast link for sidelink communications with UE 404 by using component beam 406a and/or component beam 406b. In some configuration, UE 404 may implement a multi-beam unicast link for sidelink communications with UE 402 by using component beam 408a and/or component beam 408b. In some aspects, component beam 406a and component beam 406b on UE 402 can be used to form up to four beam pairs with component beam 408a and component beam 408b on UE 404. In some examples, the four beam pairs may include component beam 406a aligned with component beam 408a; component beam 406a aligned with component beam 408b; component beam 406a aligned with component beam 408a; and component beam 406b aligned with component beam 408b. Those skilled in the art will recognize that the present technology may be implemented using any number of beam pairs and/or component beams.

In some cases, a transmitting UE may transmit a sidelink transmission (e.g., a unicast transmission from a transmitting component beam to a receiving component beam) that includes a request for feedback from a receiving UE (e.g., UE 402 can transmit sidelink transmission that requests feedback from UE 404). In some aspects, the request for feedback can include a hybrid automatic repeat request (HARQ). In some instances, the request for feedback can be included with the sidelink control information (SCI). In some cases, SCI can be sent as part of a Physical Sidelink Control Channel (PSCCH) transmission (e.g., SCI 1). In some aspects, SCI can be sent as part of a Physical Sidelink Shared Channel (PSSCH) transmission (e.g., SCI 2). In some aspects, PSCCH and PSSCH can be transmitted within a same slot. In some examples, the HARQ feedback can correspond to an acknowledgement (ACK) or a negative acknowledgement (NACK).

In some examples, a transmitting UE (e.g., UE 402 and/or UE 404) may be configured to monitor the reliability of one or more component beams and/or one or more beam pairs. In some cases, a UE may assess the reliability of a component beam and/or a component beam pair in order to select a component beam and/or a beam pair for a sidelink unicast transmission. In some instances, a UE may assess the reliability of a component beam and/or a component beam pair to initiate beam refinement, to initiate beam recovery, and/or to determine radio link failure (RLF).

In some aspects, UE 402 (e.g., a transmitting UE) may determine the reliability of one or more component beams and/or one or more beam pairs can be based on feedback and/or lack of feedback UE 404 (e.g., a receiving UE). For example, UE 402 may determine that a discontinuous transmission (DTX) has occurred based on reception of a NACK from UE 404 (e.g., UE 404 fails to decode PSSCH from UE 402). In another example, UE 402 may determine that a DTX has occurred if UE 402 does not receive any response to a request for feedback for an associated sidelink transmission (e.g., UE 404 fails to decode SCI and/or PSCCH from UE 402). In another example, a UE 402 may determine that a sidelink transmission was received and decoded successfully based on reception of an ACK from UE 404.

In some aspects, UE 402 and/or UE 404 can maintain a count of a number of discontinuous transmissions (DTXs) associated with one or more beam pairs and/or one or more component beams (e.g., a counter can be used to monitor the number of DTXs). For example, UE 402 can maintain a variable (e.g., componentBeamNumConsecutiveDTX) for each component beam. In some instances, UE 402 can use DTX counts associated with component beams as a metric for link maintenance. For example, UE 402 and/or UE 404 can maintain counts for component beam 406a, component beam 406b, component beam 408a, and/or component beam 408b. In some aspects, UE 402 can maintain M+N component beam counts where M can correspond to a number of component beams that UE 402 may use for transmitting Physical Sidelink Control Channel (PSCCH) and/or Physical Sidelink Shared Channel (PSSCH) and N can correspond to a number of component beams that UE 404 may use for transmitting Physical Sidelink Feedback Channel (PSFCH).

In some examples, UE 402 and/or UE 404 can maintain a variable (e.g., beamPairNumConsecutiveDTX) for one or more of the four beam pairs (e.g., component beam 406a and component beam 408a; component beam 406a and component beam 408b; component beam 406a and component beam 408a; and component beam 406b and component beam 408b). In some cases, UE 402 can maintain M*N beam pair counts where M can correspond to a number of component beams that UE 402 may use for transmitting Physical Sidelink Control Channel (PSCCH) and/or Physical Sidelink Shared Channel (PSSCH) and N can correspond to a number of component beams that UE 404 may use for transmitting Physical Sidelink Feedback Channel (PSFCH). In some cases, a higher number of DTXs (e.g., a higher value of counter) can be associated with a lower level of reliability of a corresponding component beam and/or beam pair In some examples, UE 402 can transmit a sidelink communication to UE 404 using component beam 406a directed to component beam 408a. In some aspects, the sidelink communication can include a hybrid automatic repeat request (HARQ). In some cases, UE 402 may determine that a DTX has occurred based on a NACK received from UE 404. In some examples, UE 402 may determine that a DTX has occurred based on a lack of feedback from UE 404 (e.g., no ACK or NACK response). In some aspects, UE 402 may increment a DTX count associated with component beam 406a and/or component beam 408a. In some cases, UE 402 may increment a DTX count associated with a beam pair that includes component beam 406a and component beam 408a.

In some aspects, UE 402 can use the DTX counts associated with the component beams and/or the beam pairs to determine reliability of a component beam and/or a component beam pair. For example, UE 402 may transmit another sidelink communication to UE 404 using component beam 406a directed to component beam 408b (e.g., UE 402 can select a different beam pair after a DTX). In some aspects, UE 402 may receive an ACK from UE 404 indicating that the sidelink communication was received and decoded successfully. In some examples, UE 402 may clear or decrement a DTX count associated with component beam 406a and/or component beam 408b (e.g., based on ACK UE 402 can determine that component beam 406a and component beam 408b have a higher level of reliability). In some cases, UE 402 may clear or decrement a DTX count associated with the beam pair that includes component beam 406a and component beam 408b.

In some examples, UE 402 may transmit another sidelink communication to UE 404 using component beam 406b directed to component beam 408a. In some aspects, UE 402 may determine that a DTX has occurred (e.g., based on NACK or lack of feedback). In some cases, UE 402 may increment a DTX count associated with component beam 406*b* and/or component beam 408*a*. In some cases, UE 402 may increment a DTX count associated with the beam pair that includes component beam 406*b* and component beam 408*a*.

In some aspects, UE 402 may determine that a component beam (e.g., component beam 406*a*, 406*b*, 408*a*, and/or 408*b*) has failed and/or is otherwise deficient based on an associated DTX count. In some examples, UE 402 may be configured to determine that a component beam has failed based on a threshold value of a component beam DTX count. For example, UE 402 may determine that component beam 408*a* has failed based on an associated DTX count having a threshold value of 3. In some cases, the configuration of the threshold value can be made using a layer 3 (e.g., network layer) protocol. In some aspects, the configuration of the threshold value can be made according to a resource pool. In some examples, the configuration of the threshold value can be made according to a unicast link establishment between UE 402 and UE 404.

In some configurations, UE 402 may initiate beam refinement (e.g., Process 2 (P2) or Process 3 (P3)) of a component beam based on the value of a DTX count associated with a component beam. For example, UE 402 can initiate P2 beam refinement for a transmitter (e.g., UE 402) of component beam 406*a* and/or component beam 406*b*. In some cases, UE 402 can perform P2 beam refinement by sweeping a transmitter beam over a range for UE 404 to detect. In another example, UE 402 can initiate P3 beam refinement for a receiver (e.g., UE 404) of component beam 408*a* and/or component beam 408*b*. In some examples, UE 402 can perform P3 beam refinement by fixing a transmitter beam (e.g., transmitting same beam repeatedly) so that UE 404 can refine a receive beam (e.g., configure spatial filter on RX antenna array).

In some aspects, UE 402 can initiate beam recovery (e.g., Process 1 (P1) beam selection) based on the values of one or more of the DTX counts associated one or more of the component beams (e.g., component beam 406*a*, component beam 406*b*, component beam 408*a* and/or component beam 408*b*). In some cases, UE 402 may initiate beam recovery if there are no paired beams to facilitate HARQ handshaking with UE 404. In some examples, UE 402 may determine whether a component beam is available to facilitate HARQ handshaking based on the value of an associated DTX count. For instance, UE 402 may determine that there are no paired beams to facilitate HARQ handshaking based on a threshold value of the DTX counts associated with component beam 406*a* and component beam 406*b*.

In some examples, UE 402 may initiate beam recovery if there are less than B (e.g., where B≥1) paired beams to facilitate HARQ handshaking between UE 402 and UE 404. As noted above, UE 402 may determine the availability and/or reliability of a component beam based on the value of an associated DTX count (e.g., UE 402 can determine that a component beam is unreliable and/or unavailable based on threshold value of associated DTX count). In one illustrative example, UE 402 may initiate beam recovery if B is set to a value of 2 and a single beam pair remains to facilitate HARQ handshaking between UE 402 and UE 404 (e.g., remaining beams are associated with DTX counts having a threshold value).

In some cases, UE 402 may initiate beam recovery if there are less than T (e.g., where T≥1) component beams that can be used to reliably transmit PSCCH and/or SCI. For instance, UE 402 may initiate beam recovery of component beam 406*b* if T is set to a value of 2 and UE 402 determines (e.g., based on DTX counts, variables, counters, etc.) that only component beam 406*a* is available to transmit PSCCH (e.g., the value of the DTX count associated with component beam 406*b* exceeds a threshold value).

In some aspects, UE 402 may initiate beam recovery if there are less than R (e.g., where R≥1) component beams that can be used to reliably transmit PSFCH. For instance, UE 402 may initiate beam recovery of component beam 408*b* if R is set to a value of 2 and UE 402 determines (e.g., based on DTX counts) that only component beam 408*a* is available to transmit PSFCH (e.g., the value of the DTX count associated with component beam 408*b* exceeds a threshold value).

In some aspects, UE 402 can maintain an overall DTX count or vaiable (e.g., numConsecutiveDTX) for the sidelink interface with UE 404. In some examples, the overall DTX count may be incremented each time UE 402 detects a DTX (e.g., the overall DTX count may be incremented when a DTX occurs using any of the beam pairs). In some instances, the overall DTX count may be incremented when UE 402 determines that there are less than B paired beams to facilitate HARQ handshaking. In some cases, the overall DTX count may be incremented when UE 402 determines that there are less than T component beams that can be used to reliably transmit PSCCH and/or SC. In some examples, the overall DTX count may be incremented when UE 402 determines that there are less than R component beams that can be used to reliably transmit PSFCH. In some cases, the values of B, T, and/or R associated with incrementing the overall DTX count may be the same or different as the values for invoking beam recovery. In some examples, the values of B, T, and/or R can be set to 1 (e.g., smaller than corresponding values for beam recovery).

In some cases, UE 402 may determine that radio link failure (RLF) has occurred when the overall DTX count reaches a threshold value (e.g., sl-maxNumConsecutiveDTX). In some examples, the threshold value for determining RLF can be a relatively large value (e.g., when count is incremented per DTX). In some aspects, the threshold value for determining RLF can be a relatively small value (e.g., when count is incremented based on B, T, and/or R). In some cases, the threshold value for determining RLF can be min(M,N). In some aspects, UE 402 may re-establish a unicast link with UE 404 after that RLF has occurred.

In some aspects, UE 402 can initiate beam refinement (e.g., P2 and/or P3) and/or beam recovery (e.g., P1) based on the value of one or more DTX counts associated with one or more beam pairs (e.g., component beam 406*a* and component beam 408*a*; component beam 406*a* and component beam 408*b*; component beam 406*a* and component beam 408*a*; and component beam 406*b* and component beam 408*b*). In some cases, UE 402 may initiate beam refinement for each of the component beams in a beam pair when the DTX count for the beam pair (e.g., beamPairNumConsecutiveDTX) reaches a threshold value. For example, UE 402 can initiate P2 beam refinement of component beam 406*a* and P3 beam refinement of component beam 408*a* when a DTX count for a beam pair that includes component beam 406*a* and component beam 408*a* reaches a threshold value.

In some cases, UE 402 may initiate beam failure recovery (e.g., P1) when there are less than B' (e.g., where B'≥1) number of non-failed beam pairs (e.g., based on value of DTX count associated with beam pair) to facilitate HARQ handshaking between UE 402 and UE 404. In some examples, B' can be determined as min(M,N)/2. As noted above, UE 402 may determine the availability and/or reliability of a beam pair based on the value of an associated DTX count (e.g., UE 402 can determine that a beam pair is unreliable and/or unavailable based on threshold value of DTXs associated with the beam pair). In some aspects, UE 402 may increase an overall DTX count (e.g., for determining RLF) based on the value of beam pair DTX counts. For example, UE 402 may increase the overall DTX count when there are less than B" (e.g., where B"≥1) beam pairs available for communicating with UE 404.

In some aspects, multiple beam pairs can share a common component beam. As illustrated in Table #1 below, beam pair #1 and beam pair #2 can each share component beam (CB) 406a. In another example, beam pair #1 and beam pair #3 can each share component beam 408a.

TABLE 1

|  | Beam Pair # 1 | Beam Pair # 2 | Beam Pair # 3 | Beam Pair # 4 |
| --- | --- | --- | --- | --- |
| UE 402 (SCI) | CB 406a | CB 406a | CB 406b | CB 406b |
| UE 404 (PSFCH) | CB 408a | CB 408b | CB 408a | CB 408b |

In some aspects, UE 402 may detect a DTX based on a sidelink transmission sent using beam pair #1 and may increment the DTX count for beam pair #1 (e.g., beam pair that includes component beam 406a and component beam 408a). In some examples, UE 402 may also increment a DTX count associated with any beam pairs that include a shared component beam from beam pair #1. For instance, UE 402 may detect a DTX based on a sidelink transmission sent using beam pair #1 and may increment the DTX count for beam pair #1, beam pair #2 (e.g., shares component beam 406a with beam pair #1), and beam pair #3 (e.g. shares component beam 408a with beam pair #1). In some examples, UE 402 may increment each of the respective DTX counts using a different step size. In some cases, UE 402 may increment the DTX count associated with beam pair #1 (e.g., associated with DTX) by a first value (e.g., can increment by 2). In some cases, UE 402 may increment the DTX count associated with other beam pairs that share a component beam with beam pair #1 (e.g., beam pair #2 and/or beam pair #3) by a lower value (e.g., can increment by 1).

In some examples, UE 402 may detect a DTX based on a sidelink communication sent using a first beam pair that includes component beam 406a and component beam 408a. In some cases, UE 402 may send a request for feedback (e.g., a Type 3 HARQ codebook) using a second beam pair. In some aspects, UE 402 may send a request for feedback using a licensed carrier (e.g., without using another beam pair).

For example, UE 402 may send a request for a Type 3 HARQ codebook using a beam pair that includes component beam 406b and component beam 408b. In some examples, the request for a Type 3 HARQ codebook can include a sidelink process identifier (e.g., a sidelink process ID corresponding to sidelink communication using first beam pair with component beam 406a and component beam 408a).

In some aspects, UE 404 can use the second beam pair or a licensed band to respond to UE 402 with a Type 3 HARQ codebook that provides feedback for the sidelink process ID associated with the request (e.g., sidelink communications using first beam pair with component beam 406a and component beam 408a). In some examples, UE 402 can use the HARQ Type 3 codebook from UE 404 to determine whether the DTX was due to component beam 406a or component beam 408a. For example, UE 402 can use the HARQ Type 3 codebook to determine that the DTX was due to failed reception of SCI that is due to component beam 406a. In another example, UE 402 can use the HARQ Type 3 codebook to determine that the DTX was due to failed transmission of Physical Sidelink Feedback Channel (PSFCH) that is due to component beam 408a. In another example, UE 402 can use the HARQ Type 3 codebook to determine whether a NACK was due to a cyclic redundancy check (CRC) failure in the Physical Sidelink Shared Channel (PSSCH) payload or failed reception of SCI. In some examples, UE 402 can determine that a CRC failure in the PSSCH payload or a failed reception of SCI is due to component beam 408a.

In some aspects, UE 402 can adjust (e.g., increment, decrement, or ignore) one or more DTX counts associated with one or more component beams based on the information from the HARQ Type 3 codebook. For example, UE 402 may decrement a DTX count that was previously incremented (e.g., HARQ codebook indicates that component carrier did not cause DTX). In another example, UE 402 may not adjust DTX counts until after receiving Type 3 HARQ codebook (e.g., UE 402 may only increment the DTX count associated with one of the component carriers in the beam pair).

In some examples, UE 402 can request that UE 404 provide an SCI reception codebook (e.g., as an alternative or in addition to a Type 3 HARQ codebook). In some aspects, a request from UE 402 for an SCI reception codebook can indicate slot indices that were used to send SCI to UE 404. In some cases, slot indices that are within 31 slots from a current slot can be encoded in PSCCH reservation (e.g., encoding using legacy time IV). In some instances, UE 402 can request an SCI codebook after detecting a DTX. In some aspects, UE 404 can provide the SCI codebook as part of a layer 1 response (e.g., physical layer protocol using PSFCH). In some cases, the DTX can be associated with a first beam pair and the request can be sent using a second beam pair. In some examples, the request can include a sidelink process identifier. In some aspects, UE 402 can use information from the SCI codebook to determine whether the DTX was due to PSCCH, SCI, PSSCH, and/or PSCCH. In some configurations, UE 402 can use the information from the SCI reception codebook to adjust one or more DTX counts associated with one or more component beams and/or beam pairs.

Figure 5:
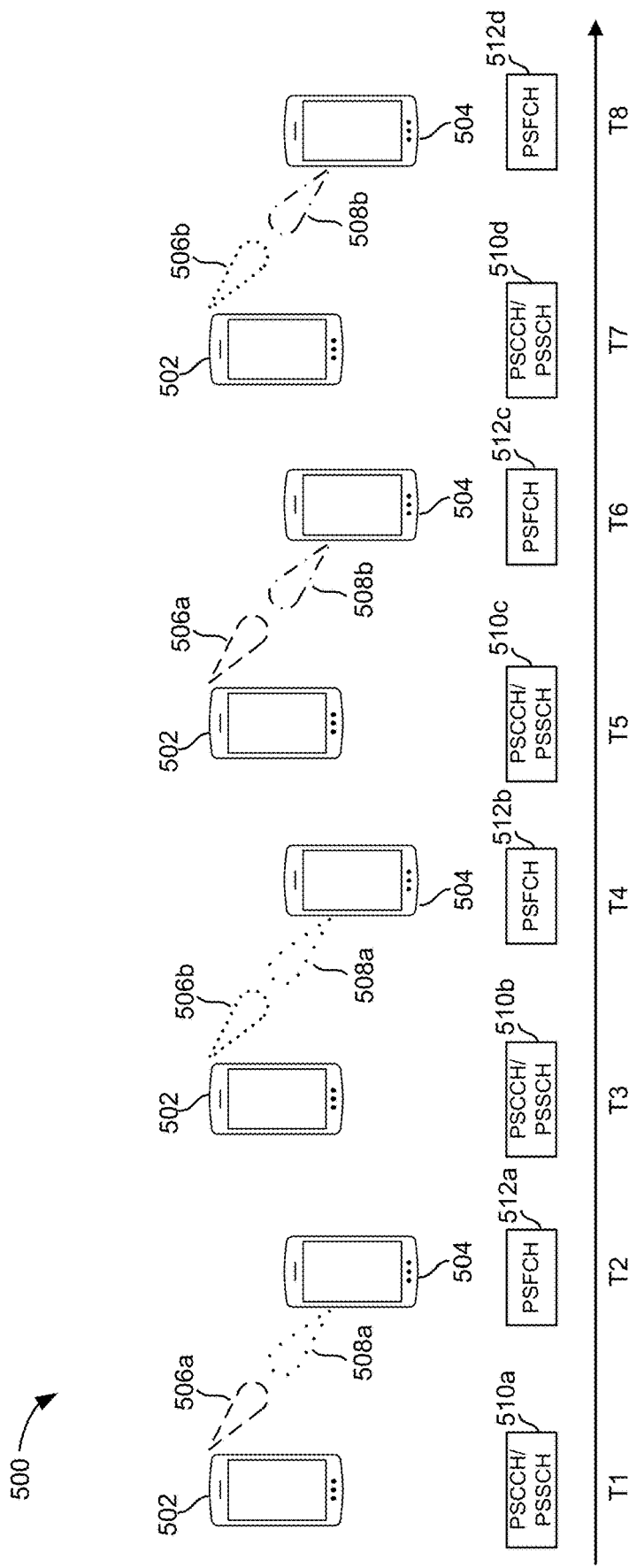
FIG. 5 is a diagram illustrating an example of a sequence for implementing a multi-beam unicast link for sidelink communications, in accordance with some examples.

FIG. 5 is a diagram illustrating an example of a sequence 500 for implementing a multi-beam unicast link for sidelink communications. In some aspects, the sequence 500 can be performed by UE 502 and UE 504. In some examples, UE 502 and UE 504 can be configured to implement a multi-beam unicast link for sidelink communications. For example, at time T1, UE 502 can be configured to transmit PSCCH/PSSCH 510a to UE 504 using a first beam pair that includes component beam 506a and component beam 508a. In some cases, at time T2, UE 504 can transmit PSFCH 512a to UE 502 using the first beam pair (e.g., component beam 506a and component beam 508a). In some aspects, UE 502 can determine that a discontinuous transmission (DTX) has occurred when UE 502 does not receive PSFCH 512a or when PSFCH 512a includes a negative acknowledgment (NACK). In some cases, UE 502 may increment one or more DTX counts that may be associated with component beam 506a, component beam 508a, and/or a first beam pair that includes component beam 506a and component beam 508a. In some examples, UE 502 may initiate beam refinement, beam recovery, and/or unicast re-establishment (e.g., radio link failure (RLF)) based on the values of one or more of the DTX counts.

In some aspects, at time T3, UE 502 can be configured to transmit PSCCH/PSSCH 510b to UE 504 using a second beam pair that includes component beam 506b and component beam 508a. In some cases, UE 502 may select the second beam pair based on the values of one or more DTX counts associated with one or more component beams and/or one or more beam pairs. In some cases, at time T4, UE 504 can transmit PSFCH 512b to UE 502 using the second beam pair (e.g., component beam 506b and component beam 508a). In some aspects, UE 502 can determine that a DTX has occurred when UE 502 does not receive PSFCH 512b or when PSFCH 512b includes a NACK. In some cases, UE 502 may increment one or more DTX counts that may be associated with component beam 506b, component beam 508a, and/or a second beam pair that includes component beam 506b and component beam 508a.

In some examples, at time T5, UE 502 can be configured to transmit PSCCH/PSSCH 510c to UE 504 using a third beam pair that includes component beam 506a and component beam 508b. In some cases, UE 502 may select the third beam pair based on the values of one or more DTX counts associated with one or more component beams and/or one or more beam pairs. In some cases, at time T6, UE 504 can transmit PSFCH 512c to UE 502 using the third beam pair (e.g., component beam 506a and component beam 508b). In some aspects, UE 502 can determine that a DTX has occurred when UE 502 does not receive PSFCH 512c or when PSFCH 512c includes a NACK. In some cases, UE 502 may increment one or more DTX counts that may be associated with component beam 506a, component beam 508b, and/or a third beam pair that includes component beam 506a and component beam 508b.

In some aspects, at time T7, UE 502 can be configured to transmit PSCCH/PSSCH 510d to UE 504 using a fourth beam pair that includes component beam 506b and component beam 508b. In some cases, UE 502 may select the fourth beam pair based on the values of one or more DTX counts associated with one or more component beams and/or one or more beam pairs. In some cases, at time T8, UE 504 can transmit PSFCH 512d to UE 502 using the fourth beam pair (e.g., component beam 506b and component beam 508b). In some aspects, UE 502 can determine that a DTX has occurred when UE 502 does not receive PSFCH 512d or when PSFCH 512d includes a NACK. In some cases, UE 502 may increment one or more DTX counts that may be associated with component beam 506b, component beam 508b, and/or a third beam pair that includes component beam 506b and component beam 508b.

Figure 6:
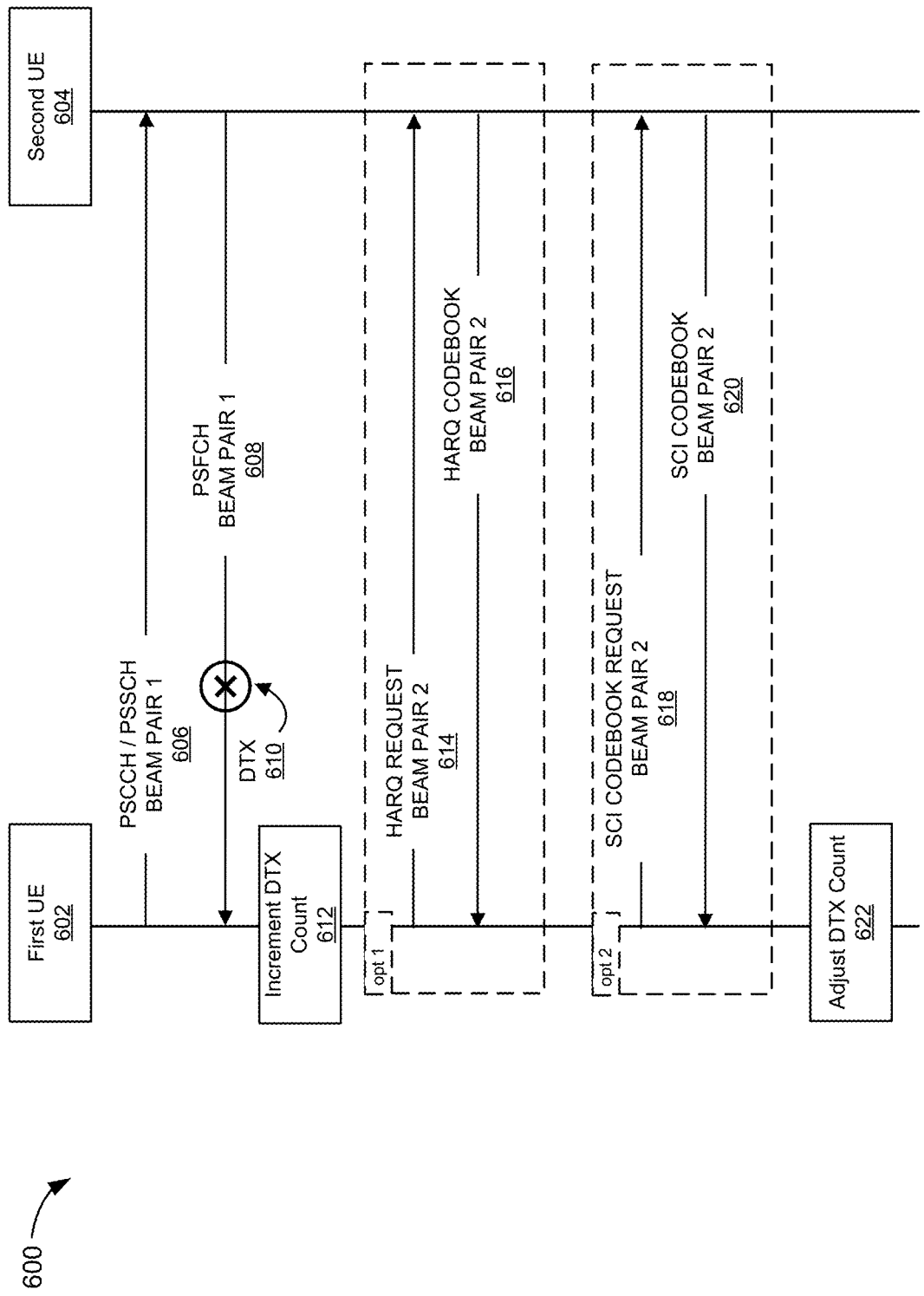
FIG. 6 is a sequence diagram illustrating another example of a sequence for implementing a multi-beam unicast link for sidelink communications, in accordance with some examples.

FIG. 6 is a sequence diagram illustrating another example of a sequence 600 for implementing a multi-beam unicast link for sidelink communications. The sequence 600 may be performed by a first UE 602 and a second UE 604. At action 606, the first UE 602 can transmit a unicast sidelink transmission to the second UE 604 using beam pair #1. In some aspects, the unicast sidelink transmission can include a Physical Sidelink Control Channel (PSCCH) transmission, a Physical Sidelink Shared Channel (PSSCH) transmission, and/or Sidelink Control Information (SCI).

At action 608, the second UE 604 may transmit feedback (e.g., Physical Sidelink Feedback Channel (PSFCH)) to the first UE 602. In some cases, the feedback can include a hybrid automatic repeat request (HARQ). In some examples, the feedback can be transmitted using beam pair #1. In some aspects, the first UE 602 may determine a discontinuous transmission (DTX) 610 associated with the sidelink transmission from action 606. For example, the first UE 602 may determine DTX 610 based on a negative acknowledgment (NACK) received as part of PSFCH from the second UE 604. In another example, the first UE 602 may determine DTX 610 based on lack of feedback from the second UE 604 (e.g., the first UE 602 does not receive PSFCH).

At action 612, the first UE 602 may increment or adjust one or more DTX counts (e.g., variables, counters, etc.) associated with the beam pair #1 and/or each the two component beams associated with beam pair #1. In some aspects, at action 614 the first UE 602 can transmit a request for a HARQ codebook (e.g., Type 3 HARQ codebook) to the second UE 604. In some cases, the request for the HARQ codebook can be sent using beam pair #2. In some examples, the request for the HARQ codebook can include a sidelink process identifier (e.g., corresponding to beam pair #1).

At action 616, the second UE 604 may respond to the first UE 602 with a HARQ codebook. In some examples, the first UE 602 can use the information from the HARQ codebook to determine whether DTX 610 was caused by a PSCCH failure, a PSSCH failure, an SCI failure, and/or a PSFCH failure. In some cases, at action 622 the first UE 602 can use the information from the HARQ codebook to adjust (e.g., increment, decrement, reset, etc.) one or more DTX counts. For example, the first UE 602 may decrement or reset a DTX count for a component beam from beam pair #1 that did not cause DTX 610.

In some cases, at action 618 the first UE 602 can transmit a request for an SCI codebook to the second UE 604. In some cases, the request for the SCI codebook can be sent using beam pair #2. In some instances, the request for the SCI codebook can include a sidelink process identifier (e.g., corresponding to beam pair #1). In some cases, the request for the SCI codebook can include one or more slot indices to indicate when the first UE 602 sent SCI to the second UE 604.

At action 620, the second UE 604 may respond to the first UE 602 with an SCI codebook. In some examples, the first UE 602 can use the information from the SCI codebook to determine whether DTX 610 was caused by a PSCCH failure, a PSSCH failure, an SCI failure, and/or a PSFCH failure. In some cases, at action 622 the first UE 602 can use the information from the SCI codebook to adjust (e.g., increment, decrement, reset, etc.) one or more DTX counts. For example, the first UE 602 may decrement or reset a DTX count for a component beam from beam pair #1 that did not cause DTX 610.

Figure 7:
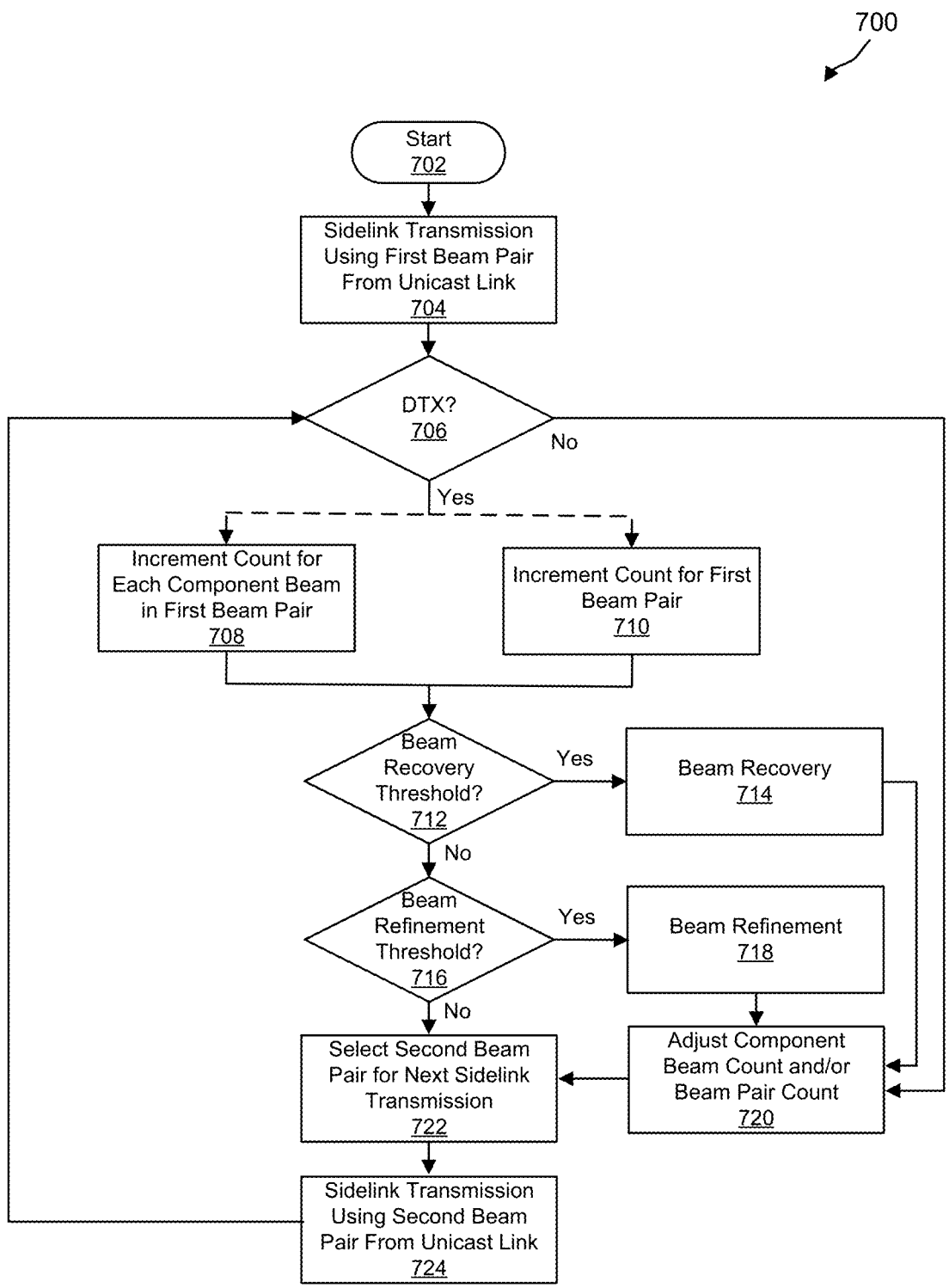
FIG. 7 is a flow diagram illustrating an example of a process for implementing a multi-beam unicast link for sidelink communications, in accordance with some examples.

FIG. 7 is a flow diagram illustrating an example of a process 700 for implementing a multi-beam unicast link for sidelink communications. The process 700 may begin at operation 702 which can include a user equipment (UE) booting up and/or initiating operations relating to sidelink communications. At operation 704, a first UE may send a sidelink transmission using a first beam pair from a unicast link with a second UE. At operation 706, the first UE can determine whether a discontinuous transmission (DTX) has occurred. In some cases, the first UE may determine that DTX has occurred based on a negative acknowledgment (NACK) received from the second UE (e.g., via a Physical Sidelink Feedback Channel (PSFCH)). In some examples, the first UE may determine that DTX has occurred based on a lack of feedback (e.g., the first UE does not receive PSFCH). In some aspects, the first UE may determine that a DTX has not occurred based on an acknowledgment (ACK) received from the second UE.

In some cases, if the first UE determines that a DTX has not occurred the process can proceed to operation 720 and the first UE can adjust component beam counts and/or beam pair counts. For example, a successful communication using the first beam pair may cause the first UE to decrement or reset a DTX count associated with the first beam pair and/or a DTX count associated with either of the component beams in the first beam pair.

In some aspects, if the first UE determines that a DTX has occurred, the process can proceed to operation 708 and/or operation 710. At operation 708, the first UE can increment DTX counts for each component beam in the first beam pair. At operation 710, the first UE can increment a DTX count for the first beam pair. In some aspects, the first UE may also increment a DTX count for one or more other beam pairs that share a component beam from the first beam pair. In some cases, the DTX count for the first beam pair can be incremented by a first value and the DTX count for other beam pairs that share a component beam from the first beam pair can be incremented by a second value. In some aspects, the first value may be greater than the second value.

At operation 712, the first UE may determine whether to invoke beam recovery for the multi-beam unicast link. In some cases, the first UE may invoke beam recovery based on the number of beam pairs and/or component beams having a DTX count that is below a threshold value. In some aspects, the first UE may determine that a beam pair and/or a component beam is unreliable when the value of a corresponding DTX count is greater than or equal to a threshold value. In some examples, the beam recovery threshold can be based on a number of beam pairs that are available for reliably communicating with the second UE based on DTX count. In some cases, the beam recovery threshold can be based on a number of component beams that are available (e.g., based on DTX count) to transmit SCI to the second UE. In some examples, the beam recovery threshold can be based on a number of component beams that are available (e.g., based on DTX count) to transmit PSFCH by the second UE.

In some aspects, if the first UE determines that the beam recovery threshold has been satisfied, the process 700 can proceed to operation 714 to perform beam recovery. In some aspects, performing beam recovery can include performing process P1 for beam selection. In some cases, process P1 can be followed by process P2 and/or process P3 for performing beam refinement of component beams used by a transmitting UE and/or beam refinement of component beams used by a receiving UE. In some examples, after performing beam recovery at operation 714 the process 700 may proceed to operation 720 to adjust component beam DTX counts and/or beam pair DTX counts. In some cases, adjusting the DTX counts after beam recovery can include resetting the DTX counts to an initial value (e.g., resetting to zero).

In some aspects, if the first UE determines that the beam recovery threshold has not been satisfied, the process 700 can proceed to operation 716. At operation 716, the first UE may determine whether to invoke beam refinement for one or more component beams in the multi-beam unicast link. In some examples, the beam refinement threshold can correspond to a threshold value of a DTX count. For example, the first UE may determine that the beam refinement threshold has been met when the DTX count for a component beam is greater than or equal to a threshold value of 3. In another example, the first UE may determine that the beam refinement threshold has been met when the DTX count for a beam pair is greater than or equal to a threshold value of 2.

In some cases, if the first UE determines that the beam refinement threshold has been satisfied, the process 700 can proceed to operation 718 in which the first UE may perform beam refinement for one or more component beams. In some examples, beam refinement can include performing process P2 by sweeping a transmitter beam over a range for the second UE to detect. In another example, beam refinement can include performing process P3 by fixing a transmitter beam (e.g., transmitting same beam repeatedly) so that the second UE can refine a receive beam (e.g., configure spatial filter on RX antenna array). In some examples, after performing beam refinement at operation 718 the process 700 may proceed to operation 720 to adjust component beam DTX counts and/or beam pair DTX counts. In some cases, adjusting the DTX counts after beam refinement can include resetting the DTX counts to an initial value (e.g., resetting to zero).

In some examples, if the first UE determines that the beam refinement threshold has not been satisfied, the process 700 can proceed to operation 722. At operation 722 the first UE may select a second beam pair for a next sidelink transmission. In some aspects, the first UE may select a second beam pair based on the value of one or more DTX counts associated with one or more component beams and/or beam pairs. For example, the first UE may select a second beam pair having the lowest beam pair DTX count value. In another example, the first UE may select a second beam pair based on the values of the DTX counts for the corresponding component beams (e.g., the first UE may select a transmission component beam and/or a receiving component beam having the lowest DTX count value). In some cases, the second beam pair may be the same as the first beam pair.

At operation 724, the process 700 can include sending a sidelink transmission using the second beam pair. In some cases, the sidelink transmission may correspond to PSCCH, PSSCH, and/or SC. In some examples, the sidelink transmission may include a request for a HARQ codebook and/or a request for an SCI codebook. After operation 724, the process 700 may return to operation 706 to determine whether a DTX has occurred. The first UE may then repeat one or more steps of process 700.

Figure 8:
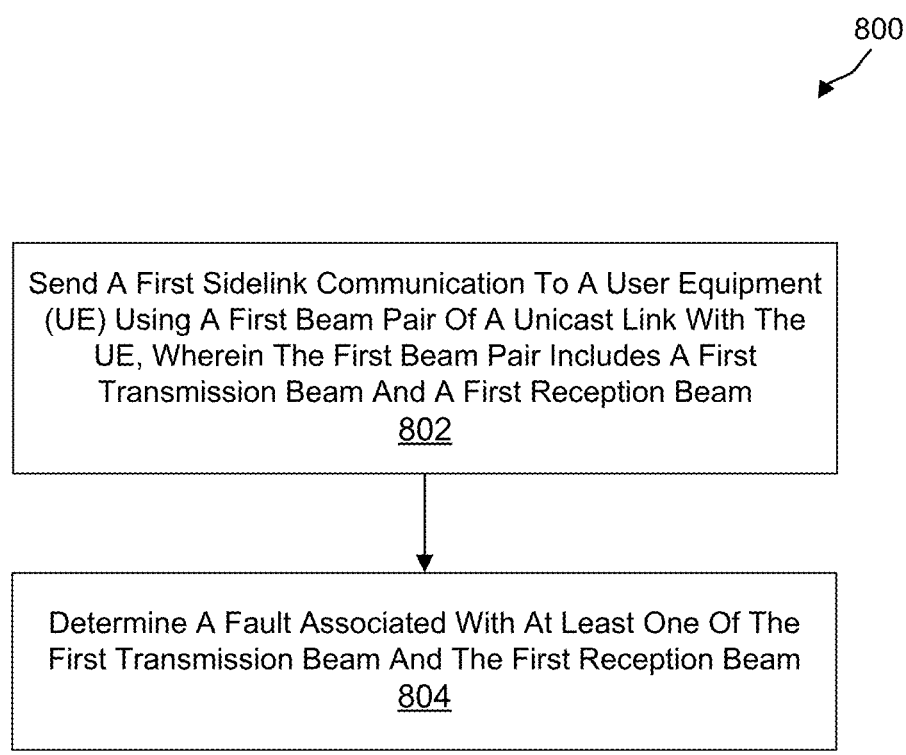
FIG. 8 is a flow diagram illustrating another example of a process for implementing a multi-beam unicast link for sidelink communications, in accordance with some examples.

FIG. 8 is a flow diagram illustrating an example of a process 800 for implementing a multi-beam unicast link for sidelink communications. At block 802, the process 800 includes sending a first sidelink communication to a user equipment (UE) using a first beam pair of a unicast link with the UE, wherein the first beam pair includes a first transmission beam and a first reception beam. For example, UE 402 can send a first sidelink communication to UE 404 using a first beam pair of a unicast link with UE 404. In some cases, the first beam pair can include component beam 406*a* (e.g., first transmission beam) and component beam 408*a* (e.g., first reception beam).

At block 804, the process 800 includes determining a fault associated with at least one of the first transmission beam and the first reception beam. For instance, UE 402 can determine a fault associated with at least one of component beam 406*a* and component beam 406*b*. In some aspects, determining the fault can correspond to determining that a discontinuous transmission (DTX) has occurred with respect to the first sidelink communication. In some aspects, the process 800 can include incrementing a discontinuous transmission (DTX) count associated with the first beam pair. For example, UE 402 can increment a DTX count associated with the beam pair that includes component beam 406*a* and component beam 408*a*. In some cases, the process 800 can include determining that a value of the DTX count associated with the first beam pair meets a beam failure threshold and initiating beam recovery of the first beam pair. For instance, UE 402 can determine that the DTX count associated with the beam pair that includes component beam 406*a* and component beam 408*a* meets a beam failure threshold value. In some cases, UE 402 can initiate beam recovery of the beam pair based on a value of the DTX count meeting the beam failure threshold value.

In some aspects, the process 800 can include determining, based on the fault, a second beam pair of the unicast link with the second UE and sending a second sidelink communication to the second UE using the second beam pair. In some examples, the second beam pair can include the first transmission beam and a second reception beam. For example, UE 402 can determine a second beam pair that does not include a component beam that is associated with the fault. In some examples, UE 402 can determine a second beam pair that includes component beam 406*a* (e.g., first transmission beam) and component beam 408*b* (e.g., second reception beam). In some cases, UE 402 can send a second sidelink communication to UE 404 using the second beam pair. In some configurations, determining the second beam pair can include initiating beam refinement of at least one of the first transmission beam and the first reception beam. For example, UE 402 can initiate beam refinement of component beam 406*a* and/or component beam 408*a*.

In some examples, the process 800 can include obtaining an acknowledgment (ACK) corresponding to the second sidelink communication and determining that the fault is associated with the first reception beam. In some cases, the process 800 can include incrementing a discontinuous transmission (DTX) count associated with the first reception beam. For instance, UE 402 can obtain an ACK corresponding to the second sidelink communication (e.g., sent using component beam 406*a* and component beam 408*b*) and UE 402 can determine that the fault is associated with component beam 408*a* (e.g., the first reception beam). In some examples, UE 402 may increment a DTX count associated with component beam 408*a*.

In some cases, the process 800 can include determining that a value of the DTX count associated with the first reception beam meets a beam refinement threshold and initiating beam refinement of the first reception beam. For example, UE 402 can determine that a value of the DTX count associate with component beam 408*b* meets a beam refinement threshold. In some examples, UE 402 can initiate beam refinement of component beam 408*b*.

In some examples, the process 800 may include sending a second sidelink communication to the second UE, wherein the fault is based on a response corresponding to the second sidelink communication. For example, UE 402 can send a second sidelink communication to UE 404. In some cases, the second sidelink communication can include a hybrid automatic repeat request (HARQ) associated with the first sidelink communication. In some aspects, the second sidelink communication can be sent using a second beam pair. In some cases, the second sidelink communication can be sent using a licensed carrier.

In some examples, the process 800 can include obtaining a response to the HARQ indicating successful reception of the first sidelink communication and determining that the fault is associated with the first reception beam. For instance, UE 402 may receive a HARQ codebook from UE 404 indicating that UE 404 successfully received the sidelink communication sent using component beam 406*a* and component beam 408*a*. In some cases, UE 402 may determine that the fault is associated with component beam 408*a* (e.g., fault associated with transmission of PSFCH).

In some cases, the process 800 may include obtaining a response to the HARQ indicating failed reception of the first sidelink communication and determining that the fault is associated with the first transmission beam. For instance, UE 402 may obtain a HARQ codebook from UE 404 indicating that UE 404 did not receive the sidelink communication sent using component beam 406*a* and component beam 408*a*. In some cases, UE 402 may determine that the fault is associated with component beam 406*a* (e.g., fault associated with transmission of SCI and/or PSCCH). In some cases, the response to the HARQ may indicate failed reception of at least one of a control message and a data message. For example, UE 402 may obtain a HARQ codebook that indicates failed reception of PSCCH (e.g., a control message) and/or PSSCH (e.g., a data message).

In some aspects, the second sidelink communication sent to the second UE can include a sidelink control information (SCI) codebook request. For example, UE 402 can send UE 404 a second sidelink communication that includes a request for an SCI codebook. In some cases, the SCI codebook request includes one or more slot indices associated with a first SCI corresponding to the first sidelink communication. For instance, the SCI codebook request from UE 402 to UE 404 may include slot indices associated with a first SCI corresponding to the first sidelink communication (e.g., sidelink communication using component beam 406*a* and component beam 408*a*). In some cases, the process 800 can include obtaining an SCI codebook indicating a reception status of a first SCI corresponding to the first sidelink communication. For example, UE 402 can obtain an SCI codebook indicating a reception status of a first SCI corresponding to the first sidelink communication (e.g., sidelink communication using component beam 406*a* and component beam 408*a*).

In some examples, the processes described herein (e.g., process 700, process 800 and/or other process described herein) may be performed by a computing device or apparatus (e.g., a UE or a base station). In one example, the process 700 and/or process 800 can be performed by the wireless device 907 of FIG. 9.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, neural processing units (NPUs), graphics processing units (GPUs), digital signal processors (DSPs), central processing units (CPUs), and/or other suitable electronic circuits), and/ or can include and/or be implemented using computer software, firmware, or any combination thereof, to perform the various operations described herein.

The processes 700 and 800 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 700, process 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
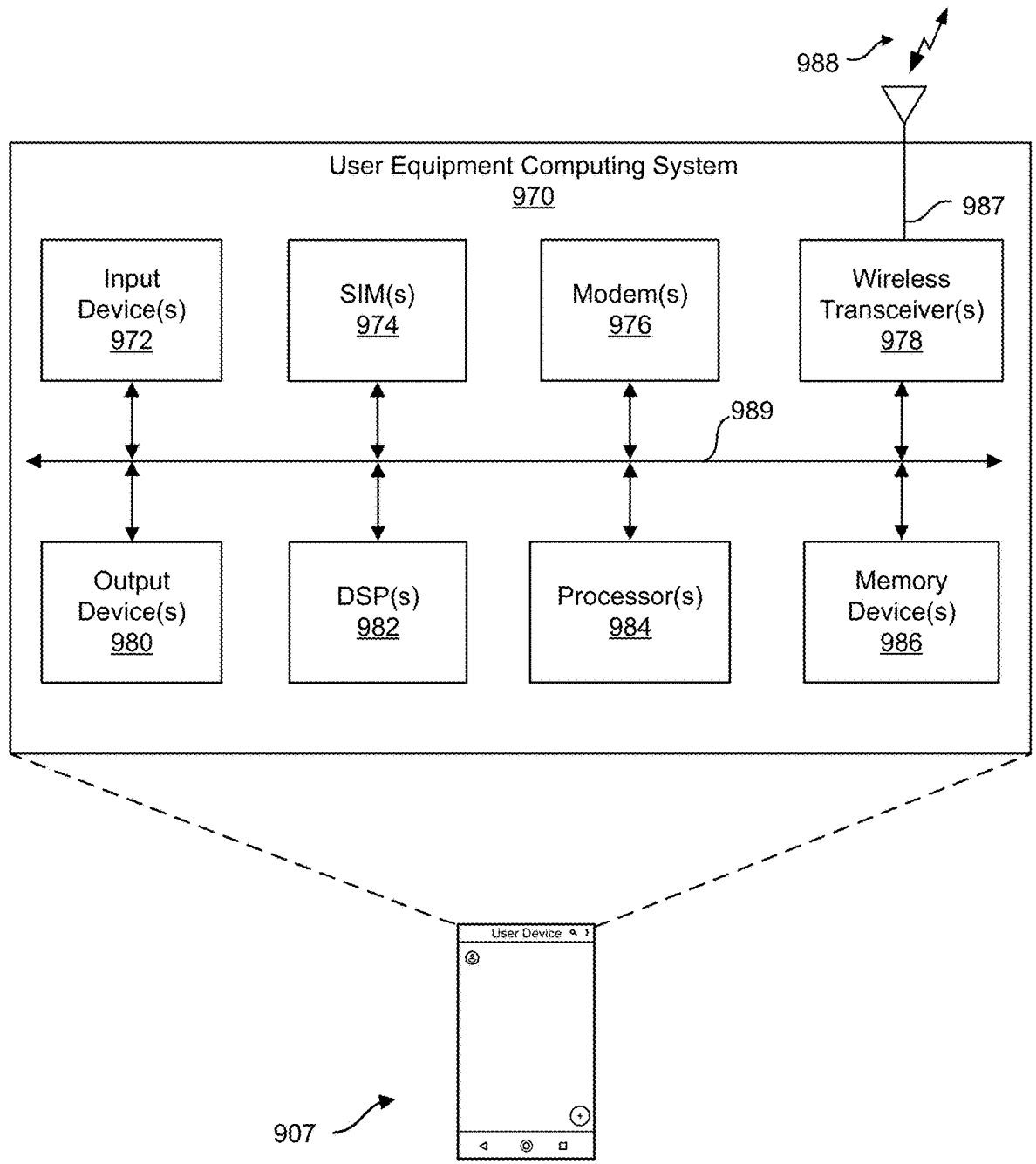
FIG. 9 is a block diagram illustrating components of a user equipment, in accordance with some examples.

FIG. 9 illustrates an example of a computing system 970 of a wireless device 907. The wireless device 907 can include a client device such as a UE (e.g., UE 104, UE 152, UE 190) or other type of device (e.g., a station (STA) configured to communication using a Wi-Fi interface) that can be used by an end-user. Wireless device can also include network devices (e.g., base stations such as eNBs and/or gNBs, Wi-Fi access points (APs) such as routers, range extenders or the like, etc.). For example, the wireless device 907 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 970 includes software and hardware components that can be electrically or communicatively coupled via a bus 989 (or may otherwise be in communication, as appropriate). For example, the computing system 970 includes one or more processors 984. The one or more processors 984 can include one or more CPUs, ASICs, FPGAs, APs, GPUs, VPUs, NSPs, microcontrollers, dedicated hardware, any combination thereof, and/or other processing device or system. The bus 989 can be used by the one or more processors 984 to communicate between cores and/or with the one or more memory devices 986.

The computing system 970 may also include one or more memory devices 986, one or more digital signal processors (DSPs) 982, one or more subscriber identity modules (SIMs) 974, one or more modems 976, one or more wireless transceivers 978, one or more antennas 987, one or more input devices 972 (e.g., a camera, a mouse, a keyboard, a touch sensitive screen, a touch pad, a keypad, a microphone, and/or the like), and one or more output devices 980 (e.g., a display, a speaker, a printer, and/or the like).

In some aspects, computing system 970 can include one or more radio frequency (RF) interfaces configured to transmit and/or receive RF signals. In some examples, an RF interface can include components such as modem(s) 976, wireless transceiver(s) 978, and/or antennas 987. The one or more wireless transceivers 978 can transmit and receive wireless signals (e.g., signal 988) via antenna 987 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 970 can include multiple antennas or an antenna array that can facilitate simultaneous transmit and receive functionality. Antenna 987 can be an omnidirectional antenna such that radio frequency (RF) signals can be received from and transmitted in all directions. The wireless signal 988 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 988 may be transmitted directly to other wireless devices using sidelink communications (e.g., using a PC5 interface, using a DSRC interface, etc.). Wireless transceivers 978 can be configured to transmit RF signals for performing sidelink communications via antenna 987 in accordance with one or more transmit power parameters that can be associated with one or more regulation modes. Wireless transceivers 978 can also be configured to receive sidelink communication signals having different signal parameters from other wireless devices.

In some examples, the one or more wireless transceivers 978 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 988 into a baseband or intermediate frequency and can convert the RF signals to the digital domain.

In some cases, the computing system 970 can include a coding-decoding device (or CODEC) configured to encode and/or decode data transmitted and/or received using the one or more wireless transceivers 978. In some cases, the computing system 970 can include an encryption-decryption device or component configured to encrypt and/or decrypt data (e.g., according to the AES and/or DES standard) transmitted and/or received by the one or more wireless transceivers 978.

The one or more SIMs 974 can each securely store an international mobile subscriber identity (IMSI) number and related key assigned to the user of the wireless device 907. The IMSI and key can be used to identify and authenticate the subscriber when accessing a network provided by a network service provider or operator associated with the one or more SIMs 974. The one or more modems 976 can modulate one or more signals to encode information for transmission using the one or more wireless transceivers 978. The one or more modems 976 can also demodulate signals received by the one or more wireless transceivers 978 in order to decode the transmitted information. In some examples, the one or more modems 976 can include a Wi-Fi modem, a 4G (or LTE) modem, a 5G (or NR) modem, and/or other types of modems. The one or more modems 976 and the one or more wireless transceivers 978 can be used for communicating data for the one or more SIMs 974.

The computing system 970 can also include (and/or be in communication with) one or more non-transitory machine-readable storage media or storage devices (e.g., one or more memory devices 986), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 986 and executed by the one or more processor(s) 984 and/or the one or more DSPs 982. The computing system 970 can also include software elements (e.g., located within the one or more memory devices 986), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the wireless device 907 can include means for performing operations described herein. The means can include one or more of the components of the computing system 970. For example, the means for performing operations described herein may include one or more of input device(s) 972, SIM(s) 974, modems(s) 976, wireless transceiver(s) 978, output device(s) (980), DSP(s) 982, processors (984), memory device(s) 986, and/or antenna(s) 987.

In some aspects, wireless device 907 can include: means for sending a first sidelink communication to a user equipment (UE) using a first beam pair of a unicast link with the UE, wherein the first beam pair includes a first transmission beam and a first reception beam; and means for determining a fault associated with at least one of the first transmission beam and the first reception beam. In some examples, the means for sending can include the one or more wireless transceivers 978, the one or more modems 976, the one or more SIMs 974, the one or more processors 984, the one or more DSPs 982, the one or more memory devices 986, any combination thereof, or other component(s) of the wireless device. In some examples, the means for determining can include the one or more processors 984, the one or more DSPs 982, the one or more memory devices 986, any combination thereof, or other component(s) of the wireless device.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1: A method for wireless communications at a first user equipment (UE), comprising: sending a first sidelink communication to a second UE using a first beam pair of a unicast link with the second UE, wherein the first beam pair includes a first transmission beam and a first reception beam; and determining a fault associated with at least one of the first transmission beam and the first reception beam.

Aspect 2: The method of Aspect 1, further comprising sending a second sidelink communication to the second UE, wherein the fault is based on whether a response to the second sidelink communication is received.

Aspect 3: The method of Aspect 2, wherein the second sidelink communication includes a hybrid automatic repeat request (HARQ) associated with the first sidelink communication.

Aspect 4: The method of Aspect 3, further comprising obtaining a response to the HARQ indicating successful reception of the first sidelink communication; and determining that the fault is associated with the first reception beam.

Aspect 5: The method of any one of Aspects 3 to 4, further comprising obtaining a response to the HARQ indicating failed reception of the first sidelink communication; and determining that the fault is associated with the first transmission beam.

Aspect 6: The method of Aspect 5, wherein the response to the HARQ indicates failed reception of at least one of a control message and a data message associated with the first sidelink communication.

Aspect 7: The method of any one of Aspects 2 to 6, wherein the second sidelink communication includes a sidelink control information (SCI) codebook request.

Aspect 8: The method of Aspect 7, wherein the SCI codebook request includes one or more slot indices associated with a first SCI corresponding to the first sidelink communication.

Aspect 9: The method of any one of Aspects 7 to 8, further comprising obtaining an SCI codebook indicating a reception status of a first SCI corresponding to the first sidelink communication Aspect 10: The method of any of Aspects 1 to 9, further comprising determining, based on the fault, a second beam pair of the unicast link with the second UE; and sending a second sidelink communication to the second UE using the second beam pair.

Aspect 11: The method of Aspect 10, wherein determining the second beam pair of the unicast link with the second UE further comprises initiating beam refinement of at least one of the first transmission beam and the first reception beam.

Aspect 12: The method of any one of Aspects 10 to 11, wherein the second beam pair includes the first transmission beam and a second reception beam.

Aspect 13: The method of Aspect 12, further comprising obtaining an acknowledgment (ACK) corresponding to the second sidelink communication; and determining that the fault is associated with the first reception beam.

Aspect 14: The method of any one of Aspects 1 to 13, further comprising incrementing a discontinuous transmission (DTX) count associated with the first reception beam.

Aspect 15: The method of Aspect 14, further comprising determining that a value of the DTX count associated with the first reception beam meets a beam refinement threshold; and initiating beam refinement of the first reception beam.

Aspect 16: The method of any one of Aspects 1 to 15, further comprising incrementing a discontinuous transmission (DTX) count associated with the first beam pair.

Aspect 17: The method of Aspect 16, further comprising determining that a value of the DTX count associated with the first beam pair meets a beam failure threshold; and initiating beam recovery of the first beam pair.

Aspect 18: An apparatus for wireless communications, comprising: a memory comprising instructions; and one or more processors configured to execute the instructions and cause the apparatus to perform a method in accordance with any one of Aspects 1-17.

Aspect 19: A user equipment (UE), comprising: at least one transceiver; a memory comprising instructions; and one or more processors configured to execute the instructions and cause the UE to perform operations in accordance with any one of Aspects 1-17, wherein the at least one transceiver is configured to transmit the first sidelink communication.

Aspect 20: An apparatus for wireless communications, comprising means for performing operations in accordance with any one of Aspects 1-17.

Aspect 21: A non-transitory computer-readable medium comprising instructions that, when executed by an apparatus, cause the apparatus to perform operations in accordance with any one of Aspects 1-17.

What is claimed is:

1. An apparatus for wireless communications at a first user equipment (UE), comprising:
   a memory comprising instructions; and
   one or more processors configured to execute the instructions and cause the apparatus to:
   send a first sidelink communication to a second UE using a first beam pair of a unicast link with the second UE, wherein the first beam pair includes a first transmission beam and a first reception beam;
   detect a fault associated with at least one of the first transmission beam or the first reception beam;
   based on the detected fault, update a value of at least one discontinuous transmission (DTX) count associated with at least one of the first transmission beam or the first reception beam;
   determine that the value of the at least one DTX count meets a threshold; and
   based on the value of the at least one DTX count meeting the threshold, initiate at least one of beam refinement or beam recovery of the first beam pair.

2. The apparatus of claim 1, wherein the one or more processors are further configured to cause the apparatus to:
   send a second sidelink communication to the second UE, wherein the fault is based on whether a response to the second sidelink communication is received.

3. The apparatus of claim 2, wherein the second sidelink communication includes a hybrid automatic repeat request (HARQ) associated with the first sidelink communication.

4. The apparatus of claim 3, wherein the one or more processors are further configured to cause the apparatus to:
   obtain a response to the HARQ indicating successful reception of the first sidelink communication; and
   determine that the fault is associated with the first reception beam.

5. The apparatus of claim 3, wherein the one or more processors are further configured to cause the apparatus to:
   obtain a response to the HARQ indicating failed reception of the first sidelink communication; and
   determine that the fault is associated with the first transmission beam.

6. The apparatus of claim 5, wherein the response to the HARQ indicates failed reception of at least one of a control message or a data message associated with the first sidelink communication.

7. The apparatus of claim 2, wherein the second sidelink communication includes a sidelink control information (SCI) codebook request.

8. The apparatus of claim 7, wherein the SCI codebook request includes one or more slot indices associated with a first SCI corresponding to the first sidelink communication.

9. The apparatus of claim 7, wherein the one or more processors are further configured to cause the apparatus to:
obtain an SCI codebook indicating a reception status of a first SCI corresponding to the first sidelink communication.

10. The apparatus of claim 1, wherein the one or more processors are further configured to cause the apparatus to:
determine, based on the fault, a second beam pair of the unicast link with the second UE; and
send a second sidelink communication to the second UE using the second beam pair.

11. The apparatus of claim 10, wherein, to determine the second beam pair of the unicast link with the second UE, the one or more processors are further configured to cause the apparatus to:
initiate beam refinement of at least one of the first transmission beam or the first reception beam.

12. The apparatus of claim 10, wherein the second beam pair includes the first transmission beam and a second reception beam.

13. The apparatus of claim 12, wherein the one or more processors are further configured to cause the apparatus to:
obtain an acknowledgment (ACK) corresponding to the second sidelink communication; and
determine that the fault is associated with the first reception beam.

14. The apparatus of claim 13, wherein, to update the at least one DTX count, the one or more processors are further configured to cause the apparatus to:
update DTX count associated with the first reception beam.

15. The apparatus of claim 14, wherein, to determine that the value of the at least one DTX count meets the threshold, the one or more processors are further configured to cause the apparatus to:
determine that a value of the DTX count associated with the first reception beam meets a beam refinement threshold; and
based on the value of the DTX count associated with the first reception beam meeting the beam refinement threshold, initiate beam refinement of the first reception beam.

16. The apparatus of claim 1, wherein, to update the at least one DTX count, the one or more processors are further configured to cause the apparatus to:
update a DTX count associated with the first beam pair.

17. The apparatus of claim 16, wherein, to determine that the value of the at least one DTX count meets the threshold, the one or more processors are further configured to cause the apparatus to:
determine that a value of the DTX count associated with the first beam pair meets a beam failure threshold; and
based on the value of the DTX count associated with the first beam pair meeting the beam failure threshold, initiate beam recovery of the first beam pair.

18. The apparatus of claim 1, further comprising at least one transceiver configured to transmit the first sidelink communication, wherein the apparatus is configured as the first UE.

19. A method for wireless communications performed at a first user equipment (UE), comprising:
sending a first sidelink communication to a second UE using a first beam pair of a unicast link with the second UE, wherein the first beam pair includes a first transmission beam and a first reception beam;
detect a fault associated with at least one of the first transmission beam or the first reception beam;
based on the detected fault, updating a value of at least one discontinuous transmission (DTX) count associated with at least one of the first transmission beam or the first reception beam;
determining that the value of the at least one DTX count meets a threshold; and
based on the value of the at least one DTX count meeting the threshold, initiating at least one of beam refinement or beam recovery of the first beam pair.

20. The method of claim 19, further comprising:
sending a second sidelink communication to the second UE, wherein the fault is based on whether a response to the second sidelink communication is received.

21. The method of claim 19, further comprising:
determining, based on the fault, a second beam pair of the unicast link with the second UE; and
sending a second sidelink communication to the second UE using the second beam pair.

22. The method of claim 21, wherein the second beam pair includes the first transmission beam and a second reception beam.

23. The method of claim 22, further comprising:
obtaining an acknowledgment (ACK) corresponding to the second sidelink communication; and
determining that the fault is associated with the first reception beam.

24. The method of claim 23, wherein updating the at least one DTX count comprises:
updating DTX count associated with the first reception beam.

25. The method of claim 24, wherein determining that the value of the at least one DTX count meets the threshold comprises:
determining that a value of the DTX count associated with the first reception beam meets a beam refinement threshold; and
based on the value of the DTX count associated with the first reception beam meeting the beam refinement threshold, initiating beam refinement of the first reception beam.

26. A non-transitory computer-readable medium having stored thereon instructions that, when executed by one or more processors, cause the one or more processors to:
send a first sidelink communication to a user equipment (UE) using a first beam pair of a unicast link with the UE, wherein the first beam pair includes a first transmission beam and a first reception beam;
detect a fault associated with at least one of the first transmission beam or the first reception beam;
based on the detected fault, update a value of at least one discontinuous transmission (DTX) count associated with at least one of the first transmission beam or the first reception beam;
determine that the value of the at least one DTX count meets a threshold; and
based on the value of the at least one DTX count meeting the threshold, initiate at least one of beam refinement or beam recovery of the first beam pair.

27. The non-transitory computer-readable medium of claim 26, wherein the instructions, when executed by the one or more processors, cause the one or more processors to:
determine, based on the fault, a second beam pair of the unicast link with the UE, wherein the second beam pair includes the first transmission beam and a second reception beam; and
send a second sidelink communication to the UE using the second beam pair.

28. The non-transitory computer-readable medium of claim 27, wherein the instructions, when executed by the one or more processors, cause the one or more processors to:

obtain an acknowledgment (ACK) corresponding to the second sidelink communication; and determine that the fault is associated with the first reception beam.

29. The non-transitory computer-readable medium of claim 28, wherein:

to update the at least one DTX count, the instructions, when executed by the one or more processors, cause the one or more processors to update a DTX count associated with the first reception beam; and to determine that the value of the at least one DTX count meets the threshold, the instructions, when executed by the one or more processors, cause the one or more processors to:

determine that a value of the DTX count associated with the first reception beam meets a beam refinement threshold; and based on the value of the DTX count associated with the first reception beam meeting the beam refinement threshold, initiate beam refinement of the first reception beam.

30. An apparatus for wireless communication, comprising:

means for sending a first sidelink communication to a second UE using a first beam pair of a unicast link with the second UE, wherein the first beam pair includes a first transmission beam and a first reception beam;

means for detecting a fault associated with at least one of the first transmission beam or the first reception beam;

means for, based on the detected fault, updating a value of at least one discontinuous transmission (DTX) count associated with at least one of the first transmission beam or the first reception beam;

means for determining that the value of the at least one DTX count meets a threshold; and means for, based on the value of the at least one DTX count meeting the threshold, initiating at least one of beam refinement or beam recovery of the first beam pair.

\* \* \* \* \*